United States Patent [19]

Jablin

[11] 4,050,884
[45] Sept. 27, 1977

[54] SLAG WASTE HEAT BOILER

[76] Inventor: Richard Jablin, 1438 Manor Lane, Blue Bell, Pa. 19422

[21] Appl. No.: 663,844

[22] Filed: Mar. 4, 1976

[51] Int. Cl.² .................. F24H 1/00; F27B 17/00
[52] U.S. Cl. ........................................ 432/29; 432/90
[58] Field of Search ................ 432/67, 90, 91, 29, 432/70, 71; 110/165; 322/2 R, 2 A

[56] References Cited

U.S. PATENT DOCUMENTS

| 752,726 | 2/1904 | Vehling | 266/201 |
|---|---|---|---|
| 1,807,069 | 5/1931 | McDaniel | 432/90 |
| 3,079,527 | 2/1963 | Opfermann | 322/2 |
| 3,648,152 | 3/1972 | Low | 322/2 R |
| 3,848,344 | 11/1974 | Kemmetmueller | 432/90 |

Primary Examiner—John J. Camby
Attorney, Agent, or Firm—Finnegan, Henderson, Farabow & Garrett

[57] ABSTRACT

A process for absorbing the heat from the cooling and solidification of metallurgical slags and converting of said heat into a useful form of energy such as steam. The molten slag is poured against a moving heat-transfer surface and is cooled by contact with said surface. Energy is released to said heat-transfer surface during the cooling process and is, in turn, transmitted to water which is converted to steam. Included with the process are necessary piping, steam drum, pumps and heat insulation.

18 Claims, 9 Drawing Figures

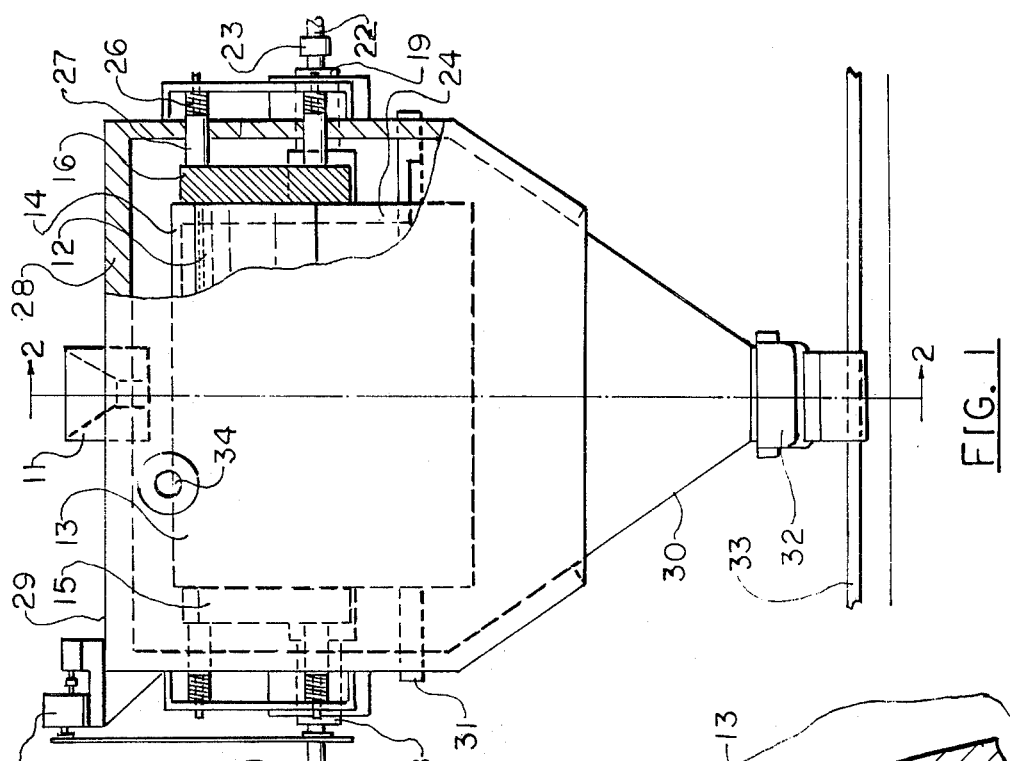
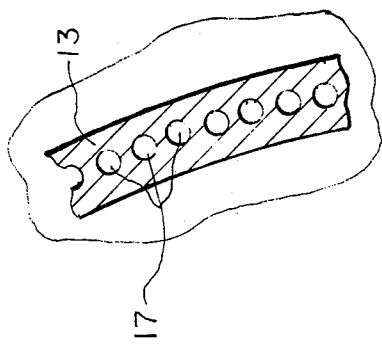
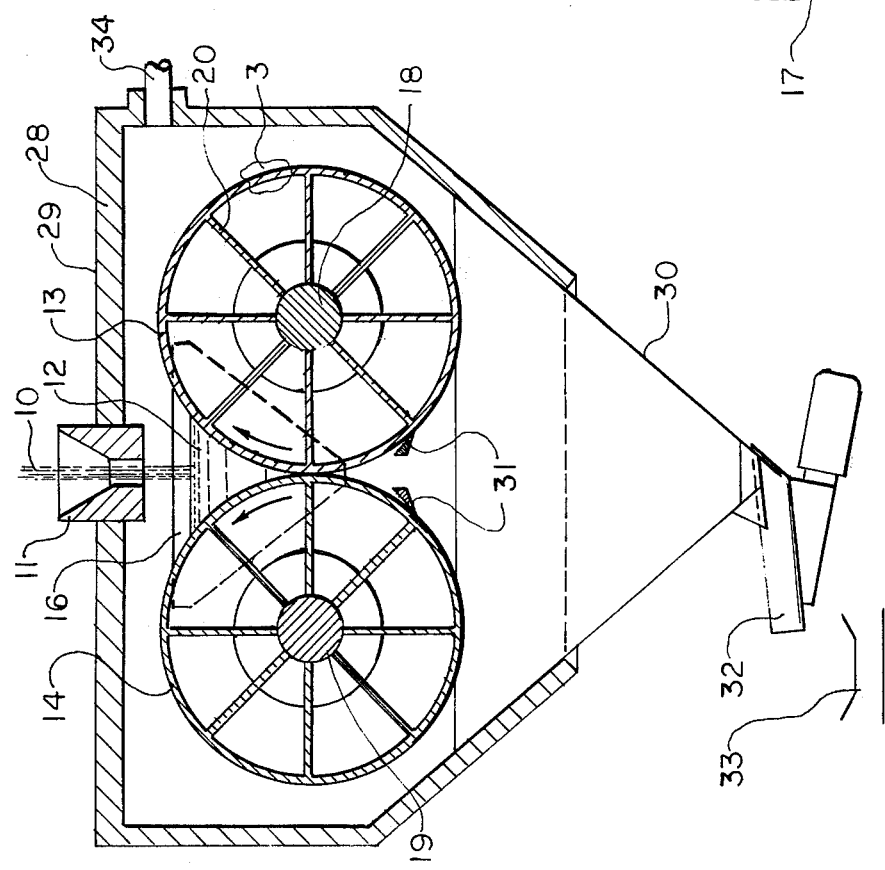

SLAG WASTE HEAT BOILER

DISCLOSURE OF INVENTION

The present invention relates to the cooling of metallurgical slags and a process for converting the energy, which is released in the cooling process, into a useful form.

Slags are produced in the refining of various metals. As an example, in the steel industry, slags are produced in ironmaking and in steelmaking. In a typical production year in the United States, approximately 50,000,000 tons are produced.

Slags are produced in a molten form and must be cooled before they can be disposed to a landfill or used as ballast in road building, concrete aggregate and so forth. Typically, slag is cooled by pouring it on the ground and allowing the heat to be released to the air, or to sprays of water. The energy of this heat is thereby wasted. In the steel industry, said waste of energy amounts to about $20 \times 10^{12}$ BTU annually, which is equivalent to about 3,200,000 barrels of fuel oil. This method of cooling also releases pollutants to the air such as hydrogen sulphide, sulphur dioxide and particles of dust.

A purpose of this invention is to convert to a useful form the energy which is released from metallurgical slags during the solidification and cooling of said slags.

A further purpose of this invention is to produce steam from the energy which is released from metallurgical slags during the solidification and cooling of said slags.

A further purpose of this invention is to produce steam or to convert to another useful form, the energy which is released from metallurgical slags during the solidification and cooling of said slags and to do so in an essentially continuous manner.

A further purpose of this invention is to solidify and cool molten metallurgical slag in an environmentally acceptable manner by pouring it on a cooled heat-transfer surface in an enclosed housing which is vented to equipment for controlling air pollution.

A further purpose of this invention is to solidify, cool and break up molten metallurgical slag in an essentially continuous manner which facilitates the subsequent handling of the cooled lumps of said slag.

In the drawings, I have chosen to illustrate three of the numerous embodiments in which the invention may appear, selecting the forms shown from the standpoints of convenience in illustration, satisfactory operation and clear demonstration of the principles involved.

FIG. 1 is a side elevation in partial section of a dual-drum slag waste heat boiler.

FIG. 2 is a cross section on line 2—2 of FIG. 1.

FIG. 3 is an enlargement of area 3 of FIG. 1.

Figure 4:
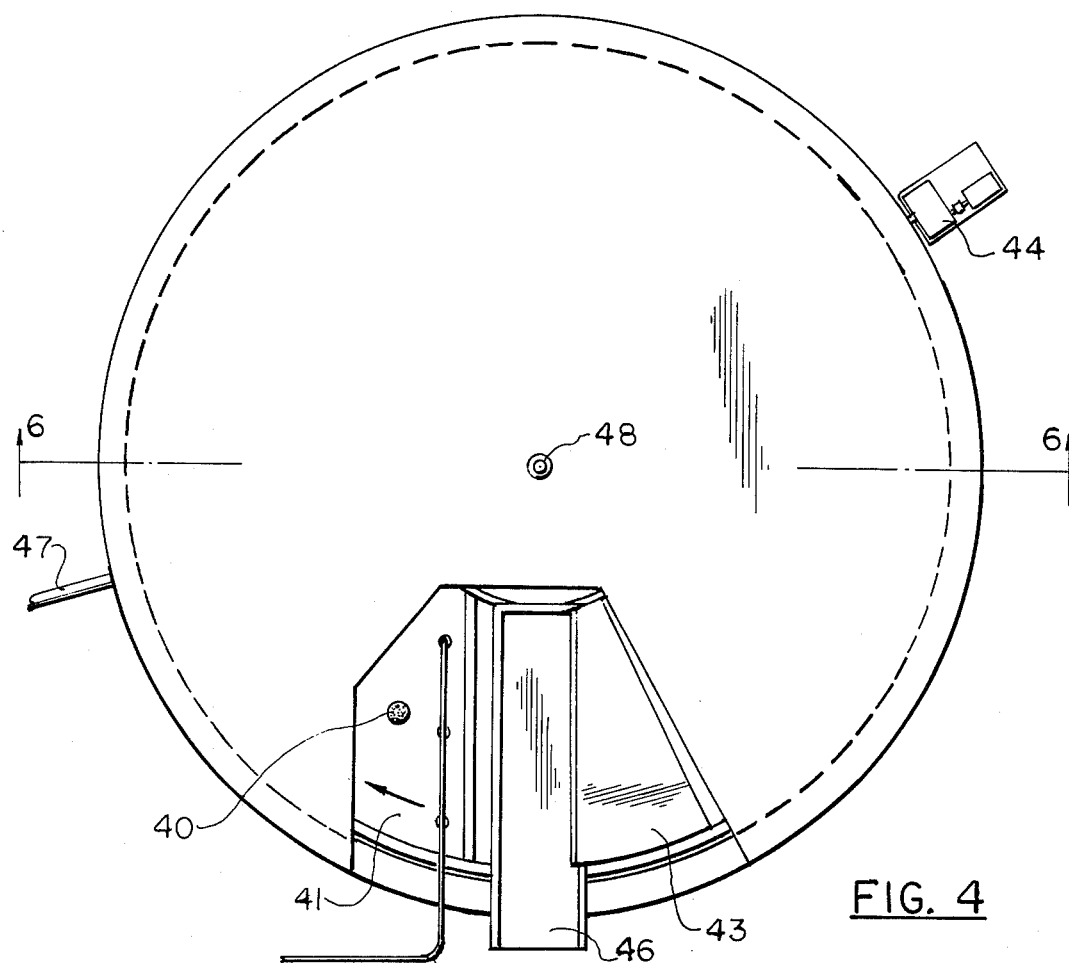
FIG. 4 is a plan view of a table-type slag waste heat boiler.

As stated, heretofore, in prior art molten metallurgical slag is solidified and cooled by pouring it on the ground and allowing the heat to be transferred to the air or water. Another prior process is to pass the molten slag through sprays of water which produces fine granules or pellets of porous slag. Both methods waste the energy of cooling and cause air pollution in the form of dust particles, hydrogen sulphide and sulphur dioxide.

I have discovered a new process for cooling molten metallurgical slag. In said process, said molten slag is poured on a heat-transfer surface, thereby solidifying and cooling said slag. The energy which is transferred from the slag to the heat transfer surface is then used to produce steam, or some other useful form of energy. After said slag has been solidified and cooled, it is scraped from the heat transfer surface. The speed of movement of said heat transfer surface is regulated so as to produce a desired thickness of slag layer, which, when scraped off said surface, produces a desired size of lumps of said slag.

First considering the drawing of FIGS. 1, 2 and 3, the molten metallurgical slag 10 is poured through a refractory funnel 11 into slag basin 12. Said basin is formed by two abutting heat-transfer drums 13 and 14 and by end dams 15 and 16.

Said heat-transfer drums have cylindrical tubes 17 cast integrally in the periphery of said drums as shown in FIG. 3. Said tubes may also be separate members which are physically attached to the inside surface of the periphery of said drums. Said tubes may be hollow cylinders as shown in the drawing, through which water is circulated to absorb the heat which is released in the solidification and the cooling of the molten slag and which converts said water to steam. Other forms of heat absorbers than water are possible, one such being thermo-electric converters which transfer the heat energy into electrical energy.

Heat-transfer drums 13 and 14 are mounted on shafts 18 and 19 through support arms 20. The ends of said shafts are hollow and are connected to inlet water pipe 21 and outlet steam pipe 22 through rotating joints 23. A continuous water circuit is formed through the connection of said hollow ends of the said shafts with the cylindrical tubes 17 by means of tubes which are cast integrally with or attached to the inside of the end plates 24 of said rotating drums. Thus, water enters the inlet water pipe 21, moves radially outward to the cylindrical tubes 17 where heat is absorbed to produce steam and finally moves radially inward to deliver steam through outlet steam pipe 22. Depending on the rate of water flow, the output may be saturated steam, steam mixed with water, heated water, or superheated steam.

The heat-transfer drums 13 and 14 are driven by variable speed drive 25 so as to produce rotation in th direction of the arrows as seen in FIG. 2. Molten slag from slag basin 12 solidifies in a layer of appoximately uniform thickness on said drums. The thickness of the slag layer depends on the speed of rotation of said drums, the rate of heat transfer from said molten slag to said drums, and the depth of the molten slag in the slag basin 12. The higher the rate of heat transfer, the slower the rotational speed, or the deeper the basin, the thicker will be said slag layer. One or all of the three above mentioned factors may be controlled to produce a desired thickness of slag layer.

The end dams 15 and 16 are faced with a refractory material which is resistant to the attack of the molten slag and is relatively non-wetting to the molten slag. Said end dams are pressed against the end plates 24 of the heat-transfer drums 13 and 14 in order to prevent leakage of molten slag from the ends of slag basin 12. Springs 26 act upon the ends of guide rods 27 to insure continuous pressure of said dams against said end plates. Pneumatic cylinders or counterweights acting through levers may be substituted for said springs. The bearings for shafts 18 and 19 are mounted in horizontal slide ways and are spring-loaded so as to force heat-transfer drums 13 and 14 into resilient, pressure-loaded contact, thereby insuring a leak-free joint between said drums.

The upper portion of the housing 29 is lined with insulating refractory 28 in order to conserve against unwanted loss of heat. If desired, water cooled tubes, or some other heat absorber may be installed inside of said insulating refractory in order to improve the efficiency of heat utilization. The lower portion of said housing is in the form of a hooper 30. Said hopper receives the cooled, solidified slag which is removed from the heat-transfer drums 13 and 14 by means of scrapers 31. A variable rate feeder 32, which is mounted under the bottom opening of said hopper, delivers the lumps of slag to conveyor 33, or to any other desired end delivery point. The housing 29 is vented to an approved fume collection device through vent pipe 34.

Figure 5:
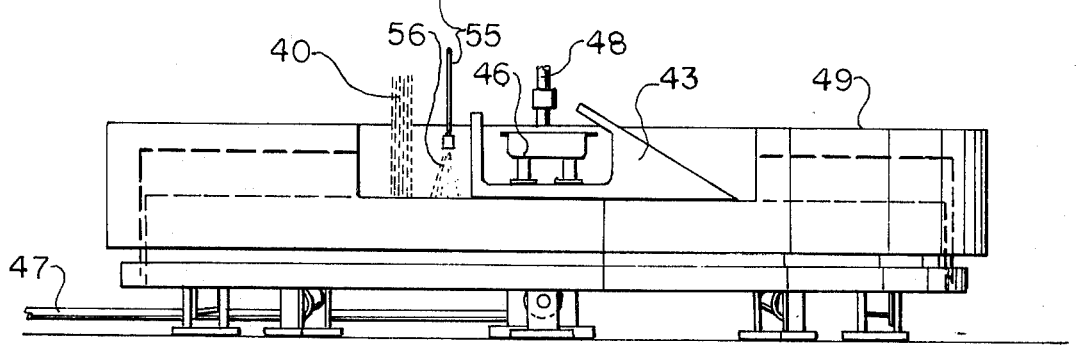
FIG. 5 is an elevation of a table-type slag waste heat boiler.
Figure 6:
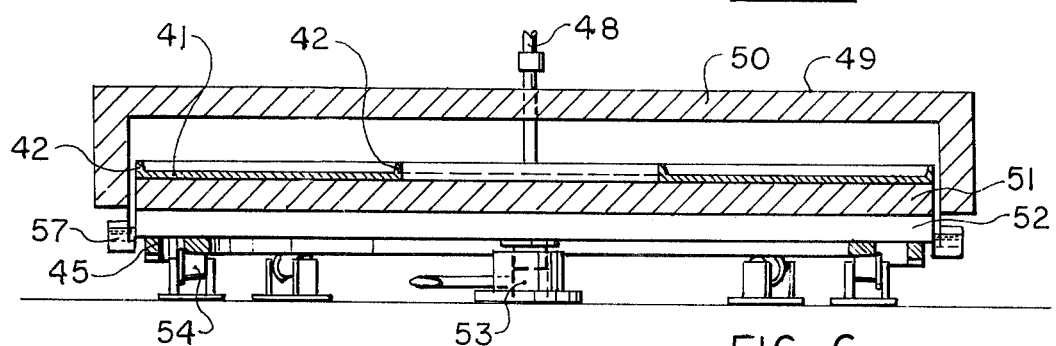
FIG. 6 is a cross section on line 6—6 of FIG. 4.

Next considering the drawings of figures 4, 5 and 6, the molten slag 40 is poured onto the top of heat-transfer surface 41. Said heat-transfer surface is in the shape of a horizontal disc with a hollow center and with side walls 42. The molten slag forms a shallow pool on said heat-transfer surface, said pool being constrained by the previously solidified slag ahead of it, by said side wall on each side and by the stationary discharge ramp 43 behind it.

The heat-transfer surface 41 is rotated in the direction of the arrow by variable speed drive 44 acting on ring gear 45. As the molten slag is carried through a rotation of said surface, said slag solidifies and cools. When said slag reaches the discharge ramp 43, it is scraped off of said surface and delivered to vibrating conveyor 46. The action of said ramp breaks up said slag into lumps. Said conveyor delivers said slag to any desired receiving equipment.

The heat-transfer surface 41 absorbs the energy which results from the solidification and cooling of the slag. In a manner similar to that described heretofore, water is admitted through inlet water pipe 47 and, after passing through tubes in said heat-transfer surface, is delivered as steam through outlet steam pipe 48.

In order to conserve heat, the outer casing 49 is lined with insulating refractory 50 and the heat-transfer surface 41 is mounted on refractory insulation 51 which, in turn, is supported by rotating table 52. Said rotating table is located by trunnion 53 and bears on rollers 54. Said trunnion is hollow to permit the flow of water from pipe 47 to distribution piping in said table and thence to said heat-transfer surface.

In order to reduce adhesion of the slag to the heat-transfer surface 41, said surface may be provided with a release coating, such as a solution of lime in water, which is delivered by pipe 55 and sprays 56. In order to reduce infiltration of air between the outer casing 49 and the rotating table 52, said table is provided with a water seal 57. The factors which affect and control the size of the lumps of slag and the alternaive means of energy absorption are as described heretofore.

Figures 7, 8:
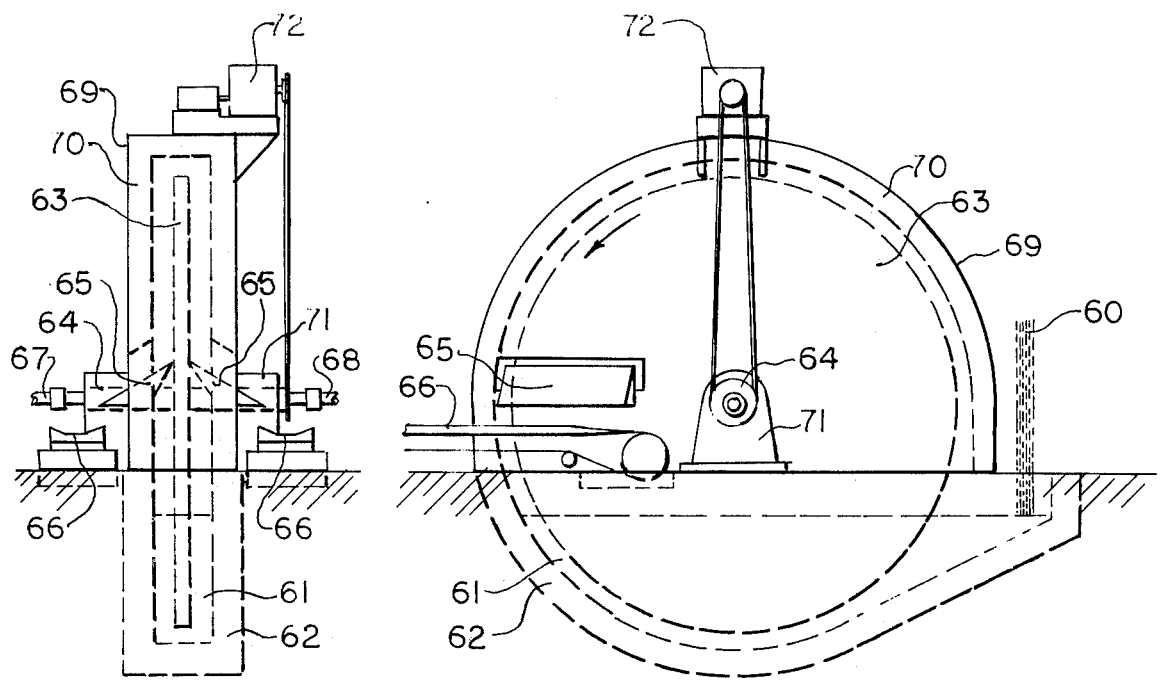
FIG. 7 is a side elevation of a vertical disc slag waste heat boiler.
FIG. 8 is an end elevation of a vertical disc slag waste heat boiler.

Next referring to the drawings of FIGS. 7 and 8, the molten slag 60 is poured into basin 61 which is lined with refractory material 62 that is resistant to chemical attack from the slag and is insulating against loss of heat. The vertical heat-transfer disc 63 is mounted on shaft 64 and rotates in the direction of the arrow through the slag in the basin 61. During said rotation, the slag solidifies on said heat-transfer disc and, as rotation continues, said slag is cooled, is removed by scrapers 65 from said heat-transfer disc, and is deposited in lump-form on conveyors 66.

The heat-transfer disc 63 absorbs the energy which results from the solidification and cooling of the slag. In a manner similar to that described heretofore, water is admitted through inlet water pipe 67 and, after passing through said heat-transfer disc, is delivered as steam through outlet steam pipe 68. The thickness of the layer of solidified slag on said heat-transfer surfaces is controlled by the speed of rotation, the depth of molten slag, and the rate of heat transfer as described heretofore.

Molten slag 60 is poured into the open end of basin 61. The remainder of said basin and the heat transfer surfaces are contained within housing 69, which is lined with insulating refractory 70. Part or all of said refractory may be replaced by heat-transfer surfaces in order to further improve the conservation of the heat energy. Bearings 71 in the ends of said housing support shaft 64 and permit rotation of said shaft by means of variable speed drive 72.

Figure 9:
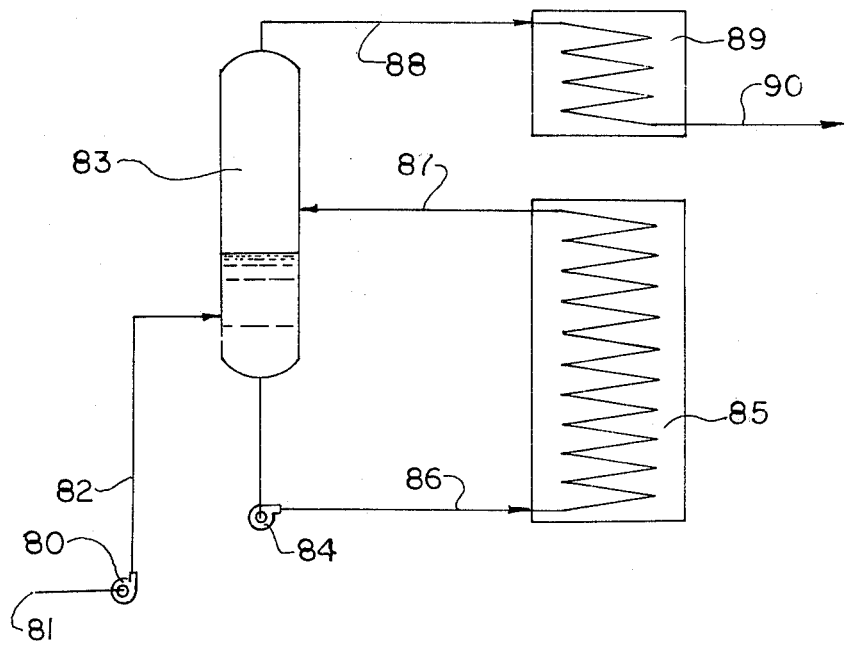
FIG. 9 is a diagram of a steam generating circuit which employs a slag waste heat boiler.

The diagram of figure 9 shows a circuit for recovering the heat energy which results from the solidification and cooling of molten metallurgical slag. In the diagram, feed pump 80 delivers boiler feed water 81 through pipe 82 to separator drum 83. Circulating pump 84 circulates said water to heat-transfer surface 85 by means of pipe 86. A mixture of steam and water leaves said heat-transfer surface by means of pipe 87 and returns to said separator drum. Heat-transfer surface 85 may be in the form of a drum, a horizontal disc, or a vertical disc, either as a single unit or multiple units.

Steam passes from the separator drum 83 by means of pipe 88 to heat-transfer surface 89 where said steam is superheated. Superheated steam is delivered by pipe 90 to the point of use. The heat-transfer surface 89 may be formed by the provision of tubes on the inside of the housing of the slag waste heat boiler, or said surface may be contained in a separately heated unit.

The diagram of figure 9 comprises a slag waste heat boiler. Various commercially available operating controls and instruments may be utilized as desired and appropriate to the service. Other boiler circuits may also be applied to achieve the desired end result of conserving the heat from the solidification and cooling of molten metallurgical slag and converting said heat to useful steam.

In view of my invention and disclosure, variations and modifications to meet particular need or individual whim will doubtless become evident to others skilled in the art, to obtain all or part of the benefits of my invention without copying the apparatus or process shown, and I therefore claim all such insofar as they fall within the reasonable spirit and scope of my claims.

Having thus described my invention, what I claim as new and desire to secure by Letters Patent is:

1. A process for cooling and solidifying molten slag and converting heat removed from the slag into a useful form of energy comprising:
   a. forming a pool of molten slag maintained in contact with a heat-transfer surface moving relative to said pool;

b. pouring fresh molten slag into said pool of molten slag;

c. cooling and solidifying slag from said pool on said heat-transfer surface while transferring heat from said cooled and solidified slag to said heat-transfer surface;

d. scraping said solidified slag from said heat transfer surface; and e. absorbing said heat from said heat-transfer surface into a heat absorber for making further use of said heat.

2. The process of claim 1, wherein said heat absorber is water that is converted into steam by absorbing said heat.

3. The process of claim 2, wherein said heat-transfer surface comprises a pair of cylindrical drums with their axes parallel and their major surfaces in resilient abutting pressure contact, and wherein step (a) comprises pouring molten slag into a basin formed above the nip of the pair of drums to form said pool of molten slag, said drums are cooled by circulating said water through tubes adjacent the surfaces of said drums, and step (c) comprises rotating said drums upwardly through said pool about their major axes to remove a layer of slag of substantially uniform thickness from said pool.

4. The process of claim 3, wherein each of said drums is mounted on a hollow shaft and said water is circulated by entering one end of said shaft, flowing radially outwardly to said tubes where it is converted to steam, and flowing radially inwardly to the other end of said shaft where it exits in the form of steam.

5. The method of claim 2, wherein said heat-transfer surface comprises a circular horizontal disc with an annular channel extending on and about the horizontal surface of said disc, and wherein step (a) comprises pouring molten slag into said channel at a single location to form said pool as a shallow pool in said channel, said disc is cooled by circulating said water through tubes abjacent to the surface of said disc, and step (c) comprises rotating said disc to remove a layer of slag of substantially uniform thickness from said pool.

6. The method of claim 5, wherein a stationary discharge ramp is provided immediately upstream of said single location, and wherein step (d) comprises scraping said solidified slag from said channel through relative movement between said surface of said disc and said discharge ramp.

7. The process of claim 2, wherein said heat-transfer surface comprises a circular vertical disc the bottom portion of which extends into a basin, and wherein step (a) comprises pouring molten slag into said basin to form said pool, said disc is cooled by circulating said water through tubes adjacent to the surface of said disc, and step (c) comprises rotating said disc to remove a layer of slag of substantially uniform thickness from said pool.

8. The process of claim 1, wherein said heat absorber is a thermo-electric converter that converts said heat into electrical energy.

9. The process of claim 1, further comprising controlling the thickness of said solidified slag by measuring and regulating the depth of said pool of molten slag, the relative velocity of said heat-transfer surface, and the rate of heat transfer from said heat-transfer surface to said heat absorber.

10. An apparatus for cooling and solidifying molten slag and converting heat from the slag into a useful form of energy, comprising:

a. a rotatable heat-transfer surface to cool and solidify said slag while absorbing heat from said slag;

b. means for maintaining a stationary pool of molten slag in contact with said heat-transfer surface;

c. means for pouring molten slag into said pool;

d. means for scraping solidified slag from said heat-transfer surface; and e. means for absorbing heat from said heat-transfer surface into a heat absorber for making further use of said heat.

11. The apparatus of claim 10, wherein said heat-transfer surface comprises a pair of cylindrical drums with their axes parallel, said apparatus further comprises means to maintain the major surfaces of said drums in resilient abutting pressure contact, said means for maintaining a pool of molten slag comprises a basin formed above the nip of said pair of drums, said means for absorbing heat comprises tubes to circulate water adjacent the surfaces of said drums, and said apparatus further comprises means for rotating said drums upwardly through said pool about their major axes to remove a layer of slag of substantially uniform thickness from said basin.

12. The apparatus of claim 11, wherein said means for absorbing heat further comprises first and second hollow shafts on which said drums are respectively mounted, said shafts each having an inlet end with means permitting entry of cooling water and directing flow of cooling water radially outwardly to said tubes and an outlet end with means permitting radially inward flow from said tubes and exit of steam.

13. The apparatus of claim 11, wherein said means for maintaining a pool of molten slag further comprises refractory dams positioned to press slidingly against said drums in an axial direction and close the sides of said basin.

14. The apparatus of claim 10, wherein said heat transfer surface comprises a circular horizontal disc, said means for maintaining a pool of molten slag comprises an annular channel extending on and about the horizontal surface of said disc, said means for pouring molten slag comprises pouring means at a single locaction above said channel, said means for absorbing heat comprises tubes to circulate water adjacent the surface of said disc, and said apparatus further comprises means for rotating said disc to remove a layer of slag of substantially uniform thickness from said pool.

15. The apparatus of claim 14, wherein said means for scraping comprises a stationary discharge ramp located immediately upstream of said single location whereby solidified slag is scraped from said channel through relative movement between said surface of said disc and said discharge ramp.

16. The apparatus of claim 10, wherein said heat-transfer surface comprises a circular vertical disc, said means for maintaining a pool of molten slag comprises a basin into which the bottom portion of said disc extends, said means for absorbing heat comprises tubes to circulate water adjacent the surface of said disc, and said apparatus further comprises means for rotating said disc to remove a layer of slag of substantially uniform thickness from said pool.

17. The apparatus of claim 10, further comprising variable speed drive means for rotating said rotatable heat-transfer surface.

18. The apparatus of claim 10, further comprising a housing enclosing said apparatus, said housing including means to vent gases to a gas cleaning device.

* * * * *